(12) United States Patent
Matsumoto

(10) Patent No.: US 10,167,438 B2
(45) Date of Patent: Jan. 1, 2019

(54) COMPRESSOR FOR REFRIGERATION AND AIR CONDITIONING, AND REFRIGERATION AND AIR CONDITIONING DEVICE

(71) Applicant: Johnson Controls-Hitachi Air Conditioning Technology (Hong Kong) Limited, Hong Kong (CN)

(72) Inventor: Shigenori Matsumoto, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 31 days.

(21) Appl. No.: 15/539,171

(22) PCT Filed: Mar. 19, 2015

(86) PCT No.: PCT/JP2015/058276
§ 371 (c)(1),
(2) Date: Jun. 23, 2017

(87) PCT Pub. No.: WO2016/147385
PCT Pub. Date: Sep. 22, 2016

(65) Prior Publication Data
US 2017/0355921 A1    Dec. 14, 2017

(51) Int. Cl.
| | | |
|---|---|---|
| *C09K 5/04* | (2006.01) |
| *C10M 105/38* | (2006.01) |
| *C10M 107/32* | (2006.01) |
| *C10M 171/00* | (2006.01) |
| *F04B 39/06* | (2006.01) |
| *C10M 105/44* | (2006.01) |
| *F04B 39/00* | (2006.01) |
| *C10N 40/30* | (2006.01) |
| *F04B 39/02* | (2006.01) |
| *F25B 1/02* | (2006.01) |
| *F25B 1/047* | (2006.01) |
| *F25B 31/02* | (2006.01) |

(52) U.S. Cl.
CPC .......... *C10M 105/38* (2013.01); *C09K 5/045* (2013.01); *C10M 105/44* (2013.01); *C10M 107/32* (2013.01); *C10M 171/008* (2013.01); *F04B 39/06* (2013.01); *C10M 2207/2835* (2013.01); *C10M 2207/3025* (2013.01); *C10M 2209/106* (2013.01); *C10M 2209/1023* (2013.01); *C10N 2040/30* (2013.01); *C10N 2220/302* (2013.01); *C10N 2230/02* (2013.01); *C10N 2240/30* (2013.01); *F04B 39/00* (2013.01); *F04B 39/0207* (2013.01); *F25B 1/02* (2013.01); *F25B 1/047* (2013.01); *F25B 31/02* (2013.01)

(58) Field of Classification Search
CPC ............. C10M 105/38; C10M 105/44; C10M 171/008; C10M 107/32; C10M 2209/106; C10M 2209/1023; C10M 2207/3025; C10M 2207/2835; C09K 5/045; F04B 39/06; F04B 39/0207; F04B 39/00; C10N 2220/302; C10N 2240/30; C10N 2230/02; C10N 2040/30; F25B 1/02; F25B 1/047; F25B 31/02
USPC ..................... 252/68; 62/468, 467, 502, 529
See application file for complete search history.

(56) References Cited

U.S. PATENT DOCUMENTS

| | | | | |
|---|---|---|---|---|
| 3,378,527 A * | 4/1968 | Case | ........................ | C08G 2/00 521/137 |
| 6,410,501 B1 * | 6/2002 | Jones | ..................... | C11D 1/662 510/515 |
| 2010/0117022 A1 | 5/2010 | Carr et al. | | |
| 2014/0097379 A1 | 4/2014 | Carr et al. | | |
| 2017/0240684 A1 * | 8/2017 | Eling | ................. | C08G 18/6208 |

FOREIGN PATENT DOCUMENTS

| | | |
|---|---|---|
| EP | 2 930 228 A1 | 10/2015 |
| JP | 08-502769 A | 3/1996 |
| JP | 2011-195630 A | 10/2011 |
| JP | 2011-195631 A | 10/2011 |
| JP | 2013-076533 A | 4/2013 |
| JP | 2013-170255 A | 9/2013 |
| WO | 94/09096 A1 | 4/1994 |
| WO | 2014/087916 A1 | 6/2014 |

OTHER PUBLICATIONS

International Search Report of PCT/JP2015/058276 dated Apr. 21, 2015.
Extended European Search Report received in corresponding European Application No. 15885481.0 dated Oct. 4, 2018.

\* cited by examiner

*Primary Examiner* — Douglas J McGinty
(74) *Attorney, Agent, or Firm* — Mattingly & Malur, PC

(57) ABSTRACT

The present invention provides a compressor for refrigeration and air conditioning and a refrigeration and air conditioning device capable of achieving both favorable environmental performance and favorable refrigeration cycle efficiency. In the compressor for refrigeration and air conditioning, a refrigerator oil containing a polyol ester and a refrigerant containing difluoromethane are enclosed. The polyol ester has two or more repetitions of poly[2,2-di(alkanoyloxymethyl)oxytrimethylene] as a structural unit. Further, the polyol ester is composed of only one or both of a cyclic polyol ester, which is obtained by cyclically polymerizing a molecular chain having the structural unit, and a crosslinked polyol ester, which is obtained by crosslinking molecular chains having the structural unit with each other through a crosslinkable structural unit polymerized with the structural unit.

9 Claims, 3 Drawing Sheets

COMPRESSOR FOR REFRIGERATION AND AIR CONDITIONING, AND REFRIGERATION AND AIR CONDITIONING DEVICE

TECHNICAL FIELD

The present invention relates to a compressor for refrigeration and air conditioning and a refrigeration and air conditioning device.

BACKGROUND ART

In the field of a refrigeration and air conditioning device, from the viewpoint of conservation of the global environment, an alternative refrigerant having a lower environmental load and higher efficiency has been demanded. In particular, CFC (chlorofluorocarbons) or HCFC (hydrochlorofluorocarbons), which has been used for a long-time is rapidly converted to HFC (hydrofluorocarbons) for preventing the destruction of the ozone layer or global warming. As the performance of such an alternative refrigerant, in addition to a low environmental load, high energy efficiency, low toxicity, low inflammability, etc. are required.

Since the 3rd Conference of the Parties to the United Nations Framework Convention on Climate Change (COPS), R410A has begun to be used for room air conditioners, package air conditioners, etc., and also, HFC134a (1,1,1,2-tetrafluoroethane) has begun to be used heavily for car air conditioners. R410A is a mixed refrigerant of 50 mass % HFC32 (difluoromethane) and 50 mass % HFC125 (pentafluoroethane), and is said to have a global warming potential (GWP) of 2088. Further, HFC134a is said to have a GWP of 1430.

However, in the European Union (EU), the mounting of a car air conditioner using a refrigerant having a GWP exceeding 150 has been prohibited since 2011, and so on, and there is a possibility of further expansion of the regulations. Therefore, recently, studies of new alternative refrigerants substituted for R410A and the like have been accelerated. As the candidate for the alternative refrigerant, single refrigerants such as HFC32 (difluoromethane), HFO1234yf (2,3,3,3-tetrafluoro-1-propene), and HFO1234ze (trans-1,3,3,3-tetrafluoropropene), and mixed refrigerants formed by a mixed composition thereof are exemplified.

In a compressor provided in a refrigeration and air conditioning device, a refrigerator oil is used. The refrigerator oil plays various roles such as lubrication of a sliding section, cooling of an electric motor, and hermetical sealing of a refrigerant inside the compressor. However, when the compatibility between the refrigerator oil and the refrigerant is low, the refrigerator oil and the refrigerant are not sufficiently mixed with each other, and a refrigerator oil phase and a refrigerant phase are separated from each other. Then, the refrigerant separated from the refrigerator oil locally prevents the contact between the refrigerator oil and the sliding section. As a result, appropriate lubrication by the refrigerator oil is not performed, and the durability of the compressor may be deteriorated.

Further, part of the refrigerator oil is vaporized or is turned into airborne droplets inside the compressor, and comes outside the compressor along with the refrigerant and circulates in a refrigeration cycle. When the compatibility between the refrigerator oil and the refrigerant is low, the refrigerator oil aggregates inside a pipe or the like, and is retained in the refrigeration cycle. Then, the amount of the refrigerator oil returning to the compressor is decreased, resulting in deterioration of the function of the compressor due to the decrease in the amount of the refrigerator oil. Further, the refrigerator oil retained in the refrigeration cycle sometimes prevents the circulation or heat exchange of the refrigerant. As a result, the efficiency such as COP (Coefficient Of Performance) of the refrigeration and air conditioning device is decreased. Therefore, when converting the current refrigerant to an alternative refrigerant, also the refrigerator oil to be used in combination with the refrigerant is required to be converted to an appropriate type.

Conventionally, as the refrigerator oil suitable for use in combination with HFC32 (difluoromethane), a refrigerator oil containing a polyol ester as a base oil is known. PTL 1 describes that an ester-based oil composed of a reaction product of at least one type of neopentyl polyol selected from pentaerythritol, dipentaerythritol, tripentaerythritol, trimethylolethane, trimethylolpropane, and neopentyl glycol and at least one type of aliphatic carboxylic acid selected from linear or branched chain aliphatic carboxylic acids or one type or a plurality of types of esterifiable derivatives of such an acid is used as a lubricant.

The environmental performance of the refrigeration and air conditioning device can be improved by adopting an alternative refrigerant having a low GWP such as difluoromethane. Moreover, the alternative refrigerant having a low GWP generally tends to have a high latent heat, and therefore, when difluoromethane is adopted as the alternative refrigerant, the amount of the refrigerant to be enclosed in the refrigeration and air conditioning device can be reduced. Then, by reducing the amount of the refrigerant, the diameter of a pipe or the like provided in the refrigeration and air conditioning device can also be reduced.

CITATION LIST

Patent Literature

PTL 1: JP-T-08-502769

SUMMARY OF INVENTION

Technical Problem

However, the refrigerator oil containing the conventional polyol ester as a base oil does not achieve both favorable compatibility with difluoromethane and an appropriate high viscosity. The conventional polyol ester generally tends to have a too low viscosity. Therefore, when the refrigerator oil is in a state where difluoromethane is further mixed with the polyol ester, the viscosity of the refrigerator oil hardly reaches a generally required level. That is, the refrigerator oil containing the conventional polyol ester as a base oil cannot sufficiently play roles such as lubrication of a sliding section inside the compressor.

As a method for increasing the viscosity of a polymer such as a polyol ester, there is a method for increasing the chain length of the polymer. However, the conventional polyol ester does not have favorable compatibility with difluoromethane. Due to this, when the chain length of a polymer is increased using a heptanoic acid or the like in esterification, the nonpolarity of the polyol ester is excessively increased, and therefore, the compatibility with difluoromethane may be largely deteriorated. Further, as the molecular weight is increased, the heat dissipation of the refrigerator oil is also deteriorated. As a result, the possibility of causing a decrease in the function of the compressor or a decrease in the efficiency of the refrigeration and air conditioning device is high.

Further, in the reaction product described in PTL 1, compounds having various molecular structures are present in admixture, and the molecular structure of the reaction product is not suitable for exhibiting favorable compatibility with difluoromethane or a high viscosity. Due to this, the reaction product is not suitable for keeping the efficiency of the refrigeration and air conditioning device at a sufficient level.

In view of this, an object of the present invention is to provide a compressor for refrigeration and air conditioning and a refrigeration and air conditioning device capable of achieving both favorable environmental performance and favorable efficiency.

Solution to Problem

In order to achieve the above object, a compressor for refrigeration and air conditioning according to the present invention is characterized in that a refrigerator oil containing a polyol ester having a structural unit represented by the following general formula (1), (wherein R1 and R2 each independently represent a linear or branched alkyl group; and n represents an integer of 2 or more), and a refrigerant containing difluoromethane are enclosed, and the polyol ester is composed of only one or both of a cyclic polyol ester, which is obtained by cyclically polymerizing a molecular chain having the structural unit, and a crosslinked polyol ester, which is obtained by crosslinking molecular chains having the structural unit with each other through a crosslinkable structural unit polymerized with the structural unit, and in which n in the structural unit is 3 or more.

Further, a refrigeration and air conditioning device according to the present invention is characterized by including the compressor for refrigeration and air conditioning.

Advantageous Effects of Invention

According to the present invention, a compressor for refrigeration and air conditioning and a refrigeration and air conditioning device capable of achieving both favorable environmental performance and favorable efficiency can be provided.

DESCRIPTION OF EMBODIMENTS

Hereinafter, a compressor for refrigeration and air conditioning and a refrigeration and air conditioning device according to an embodiment of the present invention will be described in detail. Incidentally, in the following description, as one example of a refrigeration and air conditioning device including a compressor for refrigeration and air conditioning, for example, an air conditioning machine will be described. Further, configurations common to the respective drawings are denoted by the same reference signs, and a duplicate description thereof is omitted.

<Air Conditioning Machine>

Figure 1:
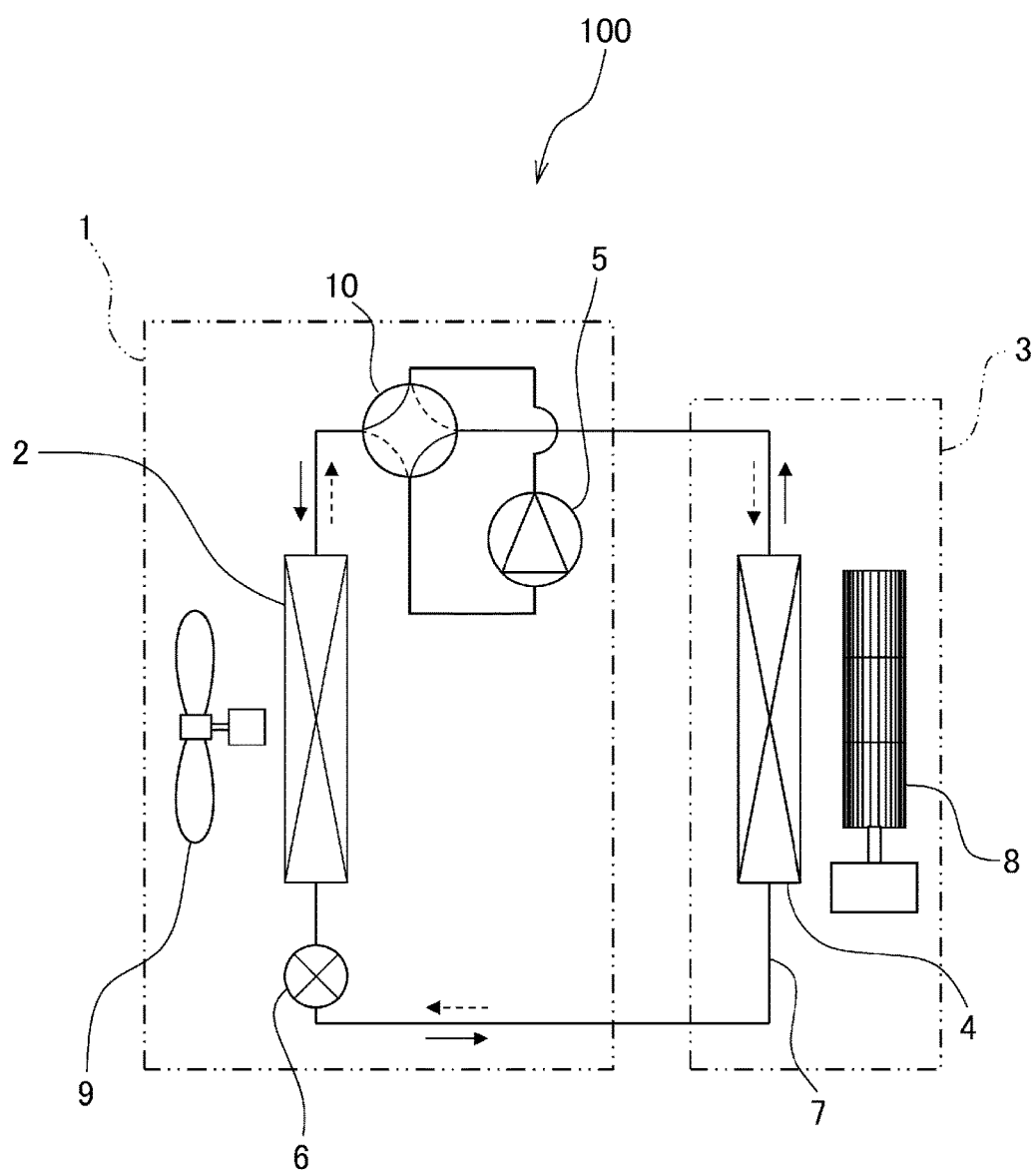
FIG. 1 is a schematic view showing a configuration of an air conditioning machine (refrigeration and air conditioning device) according to an embodiment of the present invention.

FIG. 1 is a schematic view showing a configuration of an air conditioning machine (refrigeration and air conditioning device) according to an embodiment of the present invention.

As shown in FIG. 1, an air conditioning machine 100 according to this embodiment includes an outdoor unit 1 and an indoor unit 3. The outdoor unit 1 includes a compressor (a compressor for refrigeration and air conditioning) 5, a four-way valve 10, an expansion valve 6, an outdoor heat exchanger 2, and a propeller fan 9. On the other hand, the indoor unit 3 includes an indoor heat exchanger 4 and a crossflow fan 8.

The outdoor unit 1 and the indoor unit 3 are connected through a pipe 7. The pipe 7 forms a circulation flow path in which a refrigerant circulates between the outdoor unit 1 and the indoor unit 3. To the pipe 7, each of the four-way valve 10, the compressor 5, the outdoor heat exchanger 2, the expansion valve 6, and the indoor heat exchanger 4 is connected. The refrigerant flows through each of the four-way valve 10, the outdoor heat exchanger 2, the expansion valve 6, the indoor heat exchanger 4, and the compressor 5 in this order and can circulate therethrough so as to return to the four-way valve 10 again. Further, the refrigerant flows through the four-way valve 10, the compressor 5, the indoor heat exchanger 4, the expansion valve 6, and the outdoor heat exchanger 2 in this order by switching the four-way valve 10 and can circulate therethrough so as to return to the four-way valve 10 again.

The air conditioning machine 100 shown in FIG. 1 is configured to be a heat pump system capable of switching between a cooling operation and a heating operation by the four-way valve 10. In FIG. 1, the circulation direction of the refrigerant in the cooling operation is indicated by a solid line arrow. Further, the circulation direction of the refrigerant in the heating operation is indicated by a broken line arrow.

In the cooling operation, the outdoor heat exchanger 2 functions as a condenser, and the indoor heat exchanger 4 functions as an evaporator. A gaseous refrigerant brought to a high temperature and high pressure by being compressed by the compressor 5 is supplied to the outdoor heat exchanger 2 through the four-way valve 10. Then, the refrigerant is heat-exchanged with the outdoor air in the outdoor heat exchanger 2. By the heat exchange, the outdoor air takes heat, and the gaseous refrigerant at a high temperature and high pressure is turned into a liquid refrigerant at a low temperature and high pressure. During this time, the propeller fan 9 sucks or discharges the outdoor air to promote heat exchange.

Subsequently, the refrigerant is turned into a two-phase state of a gaseous refrigerant and a liquid refrigerant at a low temperature and low pressure, and thereafter supplied to the indoor heat exchanger 4 by the expansion valve 6. Then, the refrigerant is heat-exchanged with the indoor air in the indoor heat exchanger 4. The refrigerant at a low temperature and low pressure is vaporized by heat exchange, and takes heat from the indoor air. During this time, the crossflow fan 8 sends the cooled indoor air to the inside of the room. Thereafter, the refrigerant is compressed by the compressor 5 again and circulates through a heat pump cycle (refrigeration cycle).

On the other hand, in the heating operation, the indoor heat exchanger 4 functions as a condenser, and the outdoor heat exchanger 2 functions as an evaporator. A gaseous refrigerant brought to a high temperature and high pressure by being compressed by the compressor 5 is supplied to the indoor heat exchanger 4 through the four-way valve 10. Then, the refrigerant is heat-exchanged with the indoor air in the indoor heat exchanger 4. By the heat exchange, the indoor air takes heat, and the gaseous refrigerant at a high temperature and high pressure is turned into a liquid refrigerant at a high pressure. During this time, the crossflow fan 8 sends the heated indoor air to the inside of the room.

Subsequently, the refrigerant is turned into a two-phase state of a gaseous refrigerant and a liquid refrigerant at a low temperature and low pressure, and thereafter supplied to the outdoor heat exchanger 2 by the expansion valve 6. Then, the refrigerant is heat-exchanged with the outdoor air in the outdoor heat exchanger 2. The refrigerant at a low temperature and low pressure is vaporized by heat exchange, and takes heat from the outdoor air. During this time, the propeller fan 9 sucks or discharges the outdoor air to promote heat exchange. Thereafter, the refrigerant is compressed by the compressor 5 again and circulates through a heat pump cycle.

In the pipe 7 of the air conditioning machine 100, a refrigerant containing difluoromethane is enclosed. As the refrigerant, either of a single refrigerant composed of difluoromethane and a mixed refrigerant containing difluoromethane and another refrigerant may be enclosed. As the mixed refrigerant, a refrigerant containing difluoromethane at 50 mass % or more is preferred, a refrigerant containing difluoromethane at 70 mass % or more is more preferred, and a refrigerant containing difluoromethane at 90 mass % or more is further more preferred.

The mixed refrigerant can be formed as a mixture containing, for example, trans-1,3,3,3-tetrafluoropropene (HFO1234ze), propene (R1270), propane (R290), pentafluoroethane (R125), 1,1,1,2-tetrafluoroethane (R134a), fluoroethane (R161), 1,1-difluoroethane (R152a), or the like as another refrigerant.

<Compressor>

Figure 2:
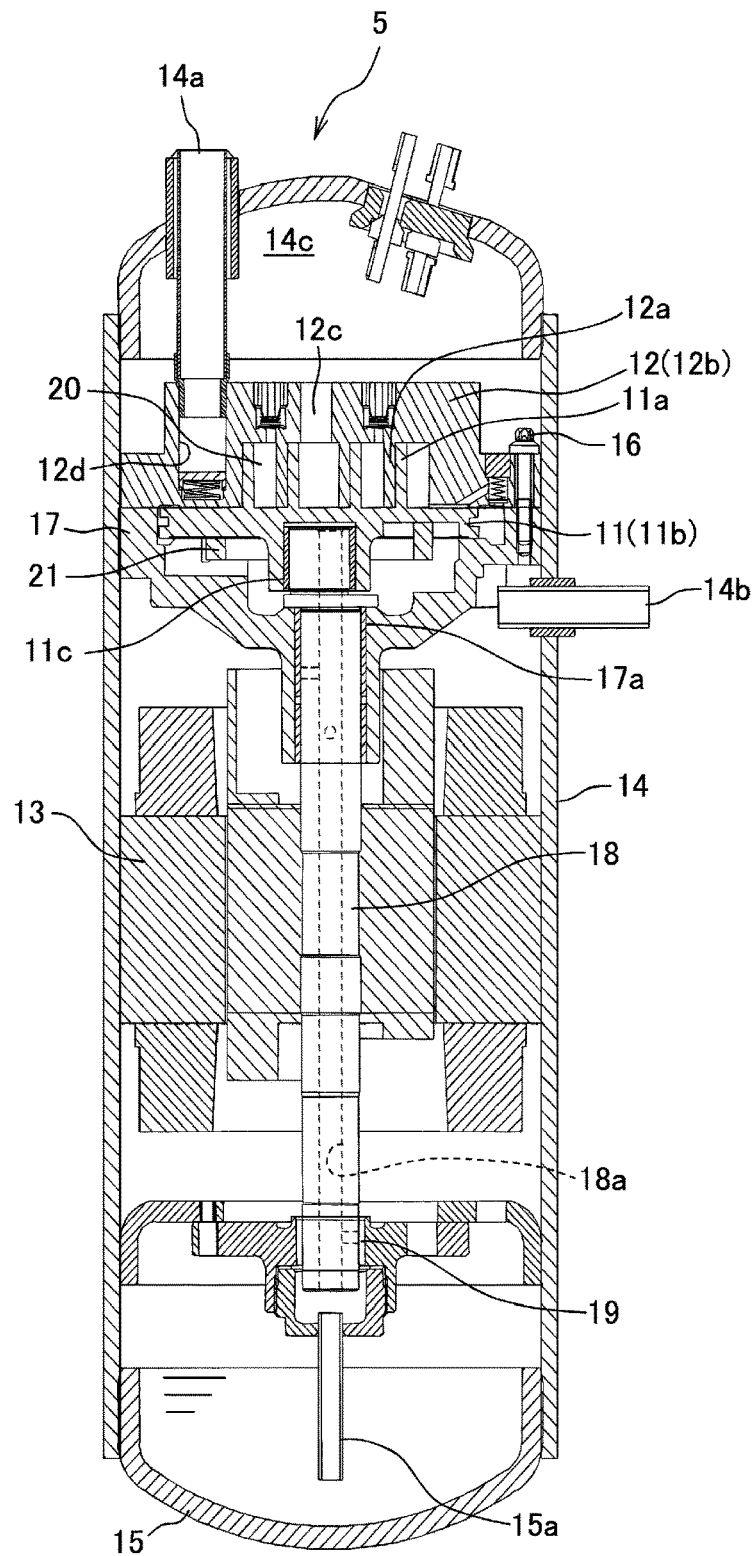
FIG. 2 is a vertical cross-sectional view of a compressor for refrigeration and air conditioning according to an embodiment of the present invention.

FIG. 2 is a vertical cross-sectional view of a compressor for refrigeration and air conditioning according to an embodiment of the present invention.

As shown in FIG. 2, a compressor for refrigeration and air conditioning (compressor) 5 according to this embodiment includes a compression mechanism section constituted by a swing scroll 11 and a fixed scroll 12, an electric motor 13, and a hermetically sealed container 14. This compressor 5 is a scroll-type hermetically sealed compressor. The electric motor 13 drives the compression mechanism section, and the compression mechanism section compresses a refrigerant. The hermetically sealed container 14 houses the compression mechanism section and the electric motor 13.

On the upper side in the hermetically sealed container 14, the compression mechanism section is disposed. The compression mechanism section is specifically constituted by the swing scroll 11, the fixed scroll 12, a frame 17, an oldham ring 21, etc. Further, on the lower side in the hermetically sealed container 14, a liquid reservoir 15 in which a refrigerator oil is retained is disposed. In a middle portion interposed between the compression mechanism section and the liquid reservoir 15, the electric motor 13 is disposed.

The fixed scroll 12 is constituted by an end plate 12b and a spiral-shaped wrap 12a vertically disposed on the end plate 12b. The fixed scroll 12 is fixed to the frame 17 bonded to an inner surface of the hermetically sealed container 14 with a bolt 16. In the center of the endplate 12b of the fixed scroll 12, a discharge port 12c is provided passing therethrough. Further, on a lateral side of the wrap 12a of the fixed scroll 12, a suction port 12d is provided.

The swing scroll 11 is constituted by an end plate 11b and a spiral-shaped wrap 11a vertically disposed on the end plate 11b. The wrap 11a of the swing scroll 11 and the wrap 12a of the fixed scroll 12 are provided so as to be engaged with each other. By engaging the wraps 11a and 12a with each other, a compression chamber 20 is formed. In the center of the back surface of the end plate 11b of the swing scroll 11, a swing bearing 11c is fixed. The swing scroll 11 is swing-movably supported between the fixed scroll 12 and the frame 17 by a crank shaft 18 pivotally supported by the swing bearing 11c.

The oldham ring 21 is provided between the swing scroll 11 and the frame 17. A key included in the oldham ring 21 on the upper side is engaged with a key groove provided on the back surface of the end plate 11b of the swing scroll 11. On the other hand, a key included on the lower side is engaged with a key groove provided in the frame 17. The swing scroll 11 which performs a swing movement is prevented from performing rotational movement by the oldham ring 21.

The electric motor 13 includes the crank shaft 18 in the center of a rotor. The crank shaft 18 is pivotally supported by a main bearing 17a on the upper side of the compressor 5. On the other hand, the crank shaft 18 is pivotally supported by a lower bearing 19 on the lower side of the compressor 5. On the upper end of the crank shaft 18, a crank which is eccentric from the main axis of the crank shaft 18 is provided, and the crank is pivotally supported by the swing bearing 11c. On the other hand, on the lower side of the lower end of the crank shaft 18, a suction tube 15a is connected. One end of the suction tube 15a is inserted into an oil reservoir 15.

The crank shaft 18 includes an oil supply passage 18a provided passing therethrough in the axial direction. The oil supply passage 18a is branched at a height where it is pivotally supported by each of the swing bearing 11c, the main bearing 17a, and the lower bearing 19. These branches pass through toward the side surface of the crank shaft 18, thereby forming a flow path of the refrigerator oil reaching a sliding section of the swing bearing 11c, the main bearing 17a, or the lower bearing 19 from the oil reservoir 15.

On an upper part of the compressor 5, a suction pipe 14a is provided. The suction pipe 14a communicates between the pipe 7 (see FIG. 1) constituting the refrigeration cycle and the suction port 12d communicating with the compression chamber 20. Further, on a side part of the compressor 5, a discharge pipe 14b is provided. The discharge pipe 14b communicates between the pipe 7 (see FIG. 1) constituting the refrigeration cycle and a space on the lower side of the frame 17.

When the electric motor 13 is operated in the compressor 5, the swing scroll 11 performs swing movement in an orbit which is eccentric with respect to the fixed scroll 12. The compression chamber 20 hermetically sealed by being interposed between the wraps 11a and 12a moves from the outer side in the circumferential direction of the wraps 11a and 12a to the center side by this swing movement. The volume of the compression chamber 20 is decreased accompanying this movement, and therefore, the refrigerant is compressed.

That is, the refrigerant flowing through the pipe 7 (see FIG. 1) constituting the refrigeration cycle is sucked from the suction pipe 14a by the operation of the electric motor 13, transferred to the compression chamber 20 through the suction port 12d, and compressed. Then, the compressed refrigerant reaches a discharge pressure chamber 14c through the discharge port 12c. Thereafter, the refrigerant is taken out from the discharge pipe 14b through a communication hole provided in the frame 17, and circulates through the pipe 7 again.

Accompanying the compression of the refrigerant, the refrigerator oil retained in the oil reservoir 15 is sucked up into the suction tube 15a due to a pressure difference or the like. Subsequently, the refrigerator oil passes through the oil supply passage 18a and is supplied to a sliding section of the swing bearing 11c, the main bearing 17a, the lower bearing 19, the compression mechanism section, or the like. Then, the refrigerator oil contributes to lubrication of the sliding section, cooling of the electric motor 13, hermetical sealing of the refrigerant, etc. Further, part of the refrigerator oil is vaporized or is turned into airborne droplets accompanying the operation of the compressor 5, and flows through the pipe 7 along with the refrigerant, and then, returns to the compressor 5 again.

<Refrigerator Oil>

The refrigerator oil contains a polyol ester having a structural unit represented by the following general formula (1) (wherein R1 and R2 each independently represent a linear or branched alkyl group; and n represents an integer of 2 or more). The polyol ester having a structural unit represented by the general formula (1) is configured to include only one or both of a cyclic polyol ester and a crosslinked polyol ester.

[Chem. 1]

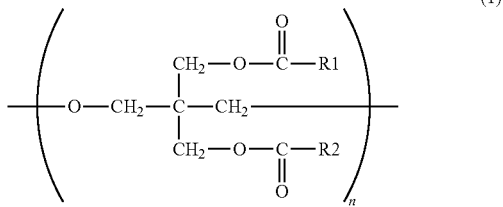

(1)

The number of repetitions (n) of the structural unit of poly[2,2-di(alkanoyloxymethyl)oxytrimethylene] represented by the general formula (1) is at least 2 or more. Such a structural unit constitutes at least part of the molecular chain (main chain) of the polyol ester. Then, to the main chain, a side chain of an alkanoyloxymethyl group, that is, a side chain having an alkyl group and a carbonyl group represented by R1 and R2 is bound. Here, an operational effect of the refrigerator oil containing the polyol ester having such a side chain will be described.

Figure 3:
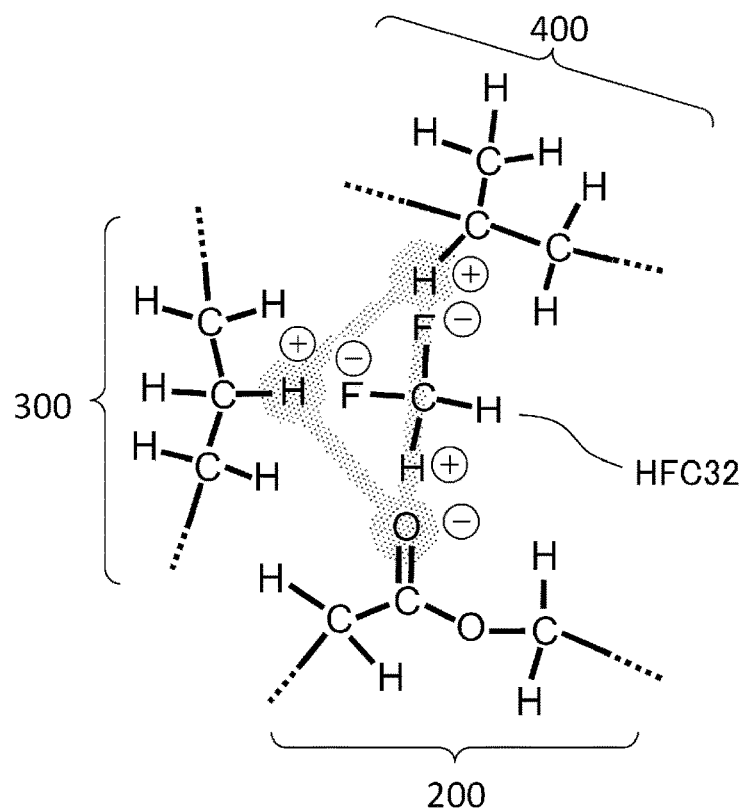
FIG. 3 is a conceptual view for illustrating easy compatibility between a refrigerator oil and a refrigerant to be enclosed in a compressor for refrigeration and air conditioning according to an embodiment of the present invention.

FIG. 3 is a conceptual view for illustrating easy compatibility between the refrigerator oil and the refrigerant to be enclosed in the compressor for refrigeration and air conditioning according to an embodiment of the present invention.

Difluoromethane (HFC32) of the refrigerant is a strongly polar molecule. As shown in FIG. 3, a hydrogen atom of difluoromethane is charged with positive (+) electricity, and a fluorine atom is charged with negative (−) electricity. On the other hand, the polyol ester having the structural unit represented by the general formula (1) has a carbonyl group and an alkyl group.

When the refrigerator oil and difluoromethane of the refrigerant are mixed, as shown in FIG. 3, a molecular chain 200 of the polyol ester can be coordinated on the hydrogen atom side of difluoromethane through an oxygen atom of a carbonyl group which is charged with negative (−) electricity. Further, molecular chains 300 and 400 of the polyol ester can be coordinated on the fluorine atom side of difluoromethane through a hydrogen atom of an alkyl group which is charged with positive (+) electricity. Incidentally, an alkyl group of the molecular chain 300 is linear, and an alkyl group of the molecular chain 400 is branched, however, the combination is not necessarily limited to such a combination. Further, such an alkyl group and a carbonyl group may be present in the same molecular chain or different molecular chains.

As shown by hatching in FIG. 3, a relatively strong dipolar interaction is formed between an oxygen atom of a carbonyl group of the molecular chain 200 and a hydrogen atom of difluoromethane, and between a hydrogen atom of an alkyl group of the molecular chain 300 or 400 and a fluorine atom of difluoromethane. Such a strong dipolar interaction energetically stabilizes the coordination of the polyol ester with difluoromethane. By such a mechanism of action, the polyol ester having the structural unit represented by the general formula (1) shows favorable compatibility with difluoromethane.

Figure 4:
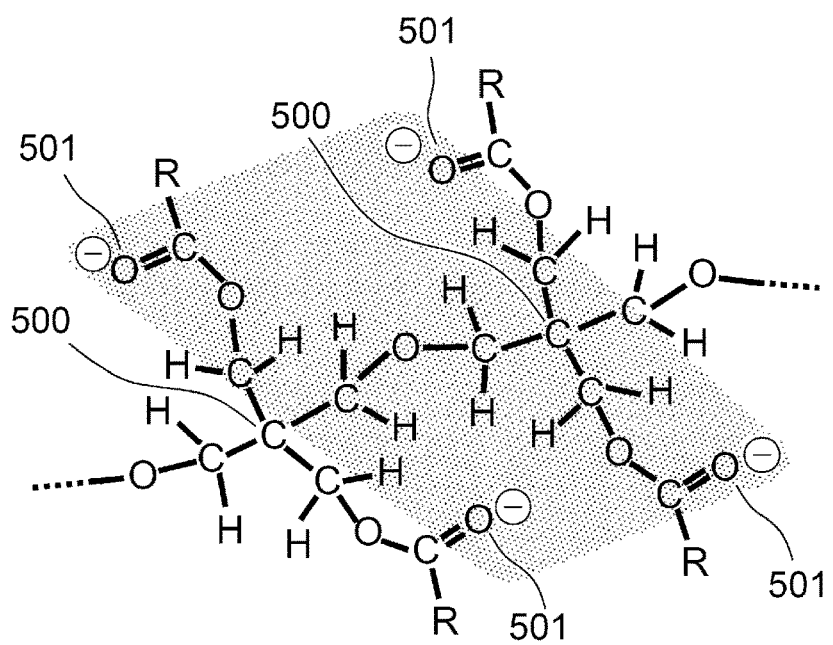
FIG. 4 is a conceptual view for illustrating the principle that a refrigerator oil to be enclosed in a compressor for refrigeration and air conditioning according to an embodiment of the present invention exhibits high viscosity.

FIG. 4 is a conceptual view for illustrating the principle that the refrigerator oil to be enclosed in the compressor for refrigeration and air conditioning according to an embodiment of the present invention exhibits high viscosity.

As shown in FIG. 4, the polyol ester having the structural unit represented by the general formula (1) has a repeating structural unit in which two side chains are bound to one carbon atom 500 in a main chain. Further, the number of repetitions of the structural unit is 2 or more, and the side chain bound to the carbon atom 500 is arranged repeatedly in the polymerization direction. Then, as shown in FIG. 4, an oxygen atom 501 of a carbonyl group of the side chain is charged with negative (−) electricity. Further, also an oxygen atom constituting the main chain is relatively strongly charged with negative (−) electricity.

The spatial arrangement (conformation) of the side chains of the polyol ester is restricted due to the electrical repulsion of such oxygen atoms. Specifically, repulsion occurs between the carbonyl groups of two side chains bound to one carbon atom 500 in the main chain or between the carbonyl group of the side chain and the oxygen atom of the main chain. Further, repulsion also occurs between the carbonyl groups of the side chains arranged repeatedly in the polymerization direction. As a result, the side chain of the polyol ester is oriented in the direction rising from the main chain. Then, in the molecule of the polyol ester, a planar structure extending two-dimensionally as shown by hatching in FIG. 4 can be formed.

By forming such a planar structure in the polyol ester, molecules can more strongly interact with each other. Further, by orienting the side chains, the main chain (molecular chain) of the polyol ester is likely to have an extended conformation. Due to this, the strong interaction between the molecules of the polyol ester is formed throughout the polymerization direction of the molecular chain. By such a mechanism of action, the polyol ester having the structural unit represented by the general formula (1) shows a favorable high viscosity.

Further, the increase in the viscosity due to such a mechanism of action can be realized without increasing the chain length of the polyol ester. Therefore, it becomes possible to make the refrigerator oil to have an appropriate high viscosity without deteriorating the compatibility with difluoromethane due to the increase in the chain length of the polyol ester. Further, it is not necessary to increase the heat capacity of the polyol ester due to the increase in the chain length thereof, and therefore, the heat dissipation of the refrigerator oil is hardly deteriorated. Due to this, it is suitable to increase the efficiency of the refrigeration and air conditioning device to a high level.

The polyol ester having the structural unit represented by the general formula (1) further has a structural characteristic also in the main chain itself in addition to such a characteristic of the side chain. This polyol ester is a polyol ester, which is composed of only one or both of a cyclic polyol ester and a crosslinked polyol ester, and in which the molecular chain (main chain) having the structural unit represented by the general formula (1) has a given molecular conformation.

The cyclic polyol ester has a cyclic structure obtained by cyclically polymerizing a molecular chain having the structural unit represented by the general formula (1). Since the main chain is cyclically polymerized, the cyclized molecular chain of the cyclic polyol ester can have a conformation extending planarly in the two axial directions. Due to this, when the cyclic polyol ester receives an external force in a liquid phase, the molecules can be mutually oriented in the same axial direction.

Incidentally, the cyclic structure of the cyclic polyol ester may be present singly in the molecule of the cyclic polyol ester, or a plurality of cyclic structures may be present in the molecule. That is, the cyclic polyol ester may be a monocyclic compound in which both ends of a single molecular chain are cyclized, or may be a polycyclic compound having a plurality of independent cyclic structures or having a cyclic structure in which monocycles are crosslinked with each other through a molecular chain.

On the other hand, the crosslinked polyol ester has a crosslinked structure in which molecular chains having the structural unit represented by the general formula (1) are crosslinked with each other through a crosslinkable structural unit polymerized with the structural unit. Since the molecular chains are crosslinked with each other, each molecular chain of the crosslinked polyol ester can have a conformation extending planarly in the two axial directions. Due to this, when the crosslinked polyol ester receives an external force in a liquid phase, the molecules can be mutually oriented in the same axial direction.

Incidentally, the crosslinkable structural unit included in the crosslinked polyol ester constitutes at least part of the molecular chain (main chain) of the polyol ester along with the structural unit represented by the general formula (1). The crosslinkable structural unit has a main chain of an oxytrimethylene structure in the same manner as the structural unit represented by the general formula (1). By binding another polyfunctional group to the crosslinkable structural unit included in each of the respective molecular chains of a plurality of polyol esters, the respective molecular chains are crosslinked with each other. The polyfunctional group is not particularly limited as long as it is a group having a structure different from the structural unit represented by the general formula (1), but is preferably a difunctional group, more preferably a dicarboxylate, further more preferably a linear or branched alkane dicarboxylate.

When the molecules of the cyclic polyol ester or the crosslinked polyol ester are mutually oriented in the same axial direction, a planar structure (see FIG. 4) formed by the orientation of the side chains is easily arranged in parallel. Due to this, the intermolecular interaction through such a planar structure is further enhanced by receiving an external force by the polyol ester. Therefore, by orienting the molecules by shear stress generated in the sliding section of the compressor 5, the cyclic polyol ester or the crosslinked polyol ester shows a further higher viscosity, and thus, exhibits excellent performance in lubrication of the sliding section or hermetical sealing of the refrigerant.

As the cyclic polyol ester, a compound represented by the following general formula (2) (wherein R1 and R2 each independently represent a linear or branched alkyl group, and n represents an integer of 2 or more) is preferred. This compound has a molecular structure obtained by cyclically polymerizing only the structural unit represented by the general formula (1). Such a compound is advantageous in that while it has favorable compatibility with difluoromethane and an appropriate high viscosity, also the heat capacity is suppressed.

[Chem. 2]

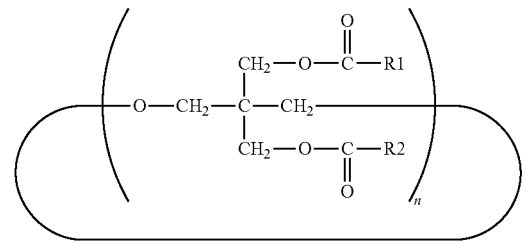

(2)

On the other hand, as the crosslinked polyol ester, a compound having each of the structural units represented by the following general formulae (3), (4), and (5) (wherein R1 and R2 each independently represent a linear or branched alkyl group; * represents a binding position to , a binding position of a hydrogen atom, a binding position of a linear or branched alkyl group, or a binding position of a linear or branched alkanoyl group;  represents a binding position to * or *, a binding position of a hydroxy group, a binding position of a linear or branched alkoxy group, or a binding position of a linear or branched alkanoyloxy group, X represents a linear or branched alkanediyl group, or a double bond; * represents a binding position to **; and n represents an integer of 3 or more) is preferred.

This compound is a compound in which a molecular chain having a structural unit represented by the general formula (3) and a molecular chain having a crosslinkable structural unit to be polymerized with the structural unit and represented by the general formula (4) are crosslinked with each other through the crosslinkable structural unit represented by the general formula (4). By binding a difunctional group represented by the general formula (5) to the crosslinkable structural unit represented by the general formula (4), a crosslink is formed. Such a compound is advantageous in that it has favorable compatibility with difluoromethane, and it is also suitable for controlling the orientation of molecules, and the viscosity is easily increased.

[Chem. 3]

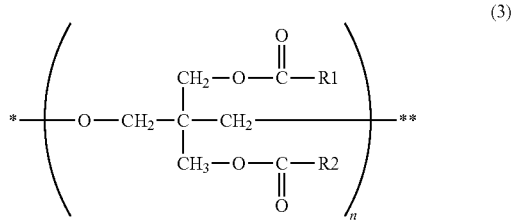

(3)

[Chem. 4]

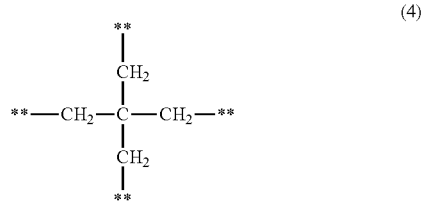

(4)

[Chem. 5]

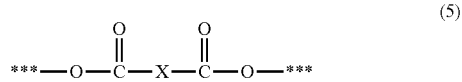

(5)

The crosslinked polyol ester may be any of a compound obtained by crosslinking linear molecular chains, a compound obtained by crosslinking cyclic molecular chains, and a compound obtained by crosslinking a linear molecular chain and a cyclic molecular chain. Further, the degrees of polymerization of the respective molecular chains to be crosslinked may be the same as or different from each other. However, a preferred compound among these is a compound obtained by crosslinking linear molecular chains. A linear molecular chain has a relatively high synthetic yield, and therefore, the synthetic efficiency is increased in the case of such a crosslinked polyol ester.

The number of molecular chains constituting the crosslinked polyol ester is not particularly limited. The crosslinked polyol ester having orientation can be obtained by crosslinking at least two or more molecules of a molecular chain having the structural unit represented by the general formula (1), that is, the general formula (3). However, the number of molecular chains is preferably 3 molecules or less, more preferably 2 molecules from the viewpoint that the refrigerator oil is made to have an appropriate high viscosity and the heat dissipation of the refrigerator oil is not deteriorated.

The number of crosslinks constituting the crosslinked polyol ester is not particularly limited. The crosslinked polyol ester having orientation can be obtained as long as crosslinking is achieved through at least one polyfunctional group (the structural unit represented by the general formula (5) or the like). Further, the binding position of the crosslink in each molecular chain may be a middle part of the main chain, or may be an end of the main chain. The number of crosslinks is preferably 2 or more, more preferably 2 or more between a pair of molecular chains from the viewpoint that the orientation of the crosslinked polyol ester is enhanced. When the number of crosslinks is 2 or more, the crosslinked polyol ester more stably has a planar molecular structure extending two-dimensionally. Due to this, in the case where an external force is applied, the molecules are oriented in parallel with each other and can more strongly intermolecularly interact with each other.

The crosslinked polyol ester preferably has a linear or branched alkanoyl group or a linear or branched alkyl group at an end of an open chain molecular chain. When the crosslinked polyol ester has an alkanoyl group at an end of an open chain molecular chain, that is, an alkanoyl group at the O end (represented by in the general formula (3)), and an alkanoyloxy group at the C end (represented by ** in the general formulae (3) and (4)), or has an alkyl group at an end of an open chain molecular chain, that is, an alkyl group at the O end and an alkoxy group at the C end, difluoromethane more easily interacts with a hydrogen atom which is charged with positive (+) electricity. In addition, the viscosity of the crosslinked polyol ester is also further increased.

In the case where the number of repetitions (n) is 3 or more, the crosslinked polyol ester may have a linear or branched alkyl group at an end of an open chain molecular chain. A molecular chain which has an alkyl group at an end of an open chain molecular chain, that is, an alkyl group at the O end and an alkoxy group at the C end is more advantageous in that when synthesizing the crosslinked polyol ester, the polyol ester can be obtained while controlling the polymerization direction.

As the crosslinked polyol ester, a compound represented by the following general formula (6) (wherein R1, R2, R3, and R4 each independently represent a linear or branched alkyl group; R5, R6, R7, and R8 each independently represent a hydrogen atom, or a linear or branched alkyl group, or a linear or branched alkanoyl group; X represents a linear or branched alkanediyl group, or a double bond; and p, q, r, and s each independently represent an integer of 0 or more, and at least one of p and q is an integer of 3 or more, and at least one of r and s is an integer of 3 or more) is more preferred.

This compound is a compound in which two molecular chains having a structural unit represented by the general formula (3) and a crosslinkable structural unit to be polymerized with the structural unit and represented by the general formula (4), respectively, are crosslinked with each other through the crosslinkable structural unit represented by the general formula (4). By binding one difunctional group represented by the general formula (5) to the crosslinkable structural unit represented by the general formula (4), a crosslink is formed. Further, to a non-crosslinked group of the crosslinkable structural unit, an alkanoyloxy group is bound. Such a compound is advantageous in that while it has favorable compatibility with difluoromethane and an appropriate high viscosity, also the heat capacity is suppressed.

[Chem. 6]

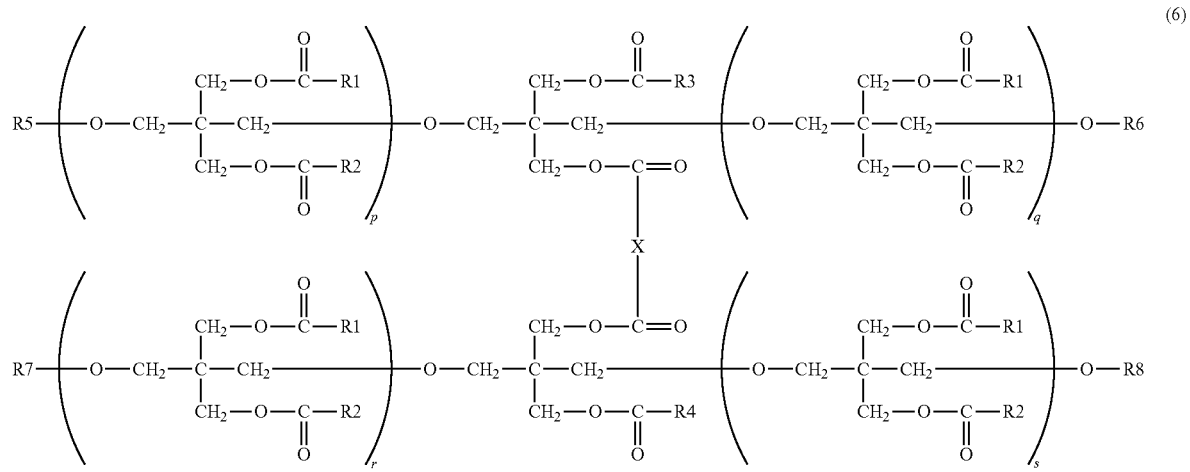

(6)

The number of repetitions (n) in the above respective general formulae is an integer of 2 or more, preferably an integer of 3 or more, more preferably an integer of 4 or more in the cyclic polyol ester. On the other hand, the number of repetitions (n) is an integer of 3 or more, preferably an integer of 4 or more in the crosslinked polyol ester. When the number of repetitions (n) is increased, the viscosity of the polyol ester can be further increased by a lot of side chains to be oriented. On the other hand, when the number of repetitions (n) is too large, the viscosity of the refrigerator oil may deviate from an appropriate level, or it may become difficult to realize the orientation of the molecules. Due to this, the upper limit of n is set to preferably 10 or less, more preferably 8 or less, further more preferably 6 or less.

Examples of the alkyl group in the respective general formulae include linear alkyl groups such as a methyl group, an ethyl group, an n-propyl group, an n-butyl group, and an n-pentyl group, and branched alkyl groups such as an isopropyl group, an isobutyl group, a sec-butyl group, a tert-butyl group, an isopentyl group, a 1-methylbutyl group, a 2-methylbutyl group, a 1-ethylpropyl group, a 1,2-dimethylpropyl group, a neopentyl group, and a tert-pentyl group.

Examples of the alkanoyl group in the respective general formulae include linear alkanoyl groups such as a methanoyl group (formyl group), an ethanoyl group (acetyl group), an n-propanoyl group (propionyl group), an n-butanoyl group, and an n-pentanoyl group, and branched alkanoyl groups such as an isopropanoyl group, an isobutanoyl group, a sec-butanoyl group, a tert-butanoyl group, an isopentanoyl group, a 1-methylbutanoyl group, a 2-methylbutanoyl group, a 1-ethylpropanoyl group, a 1,2-dimethylpropanoyl group, a neopentanoyl group, and a tert-pentanoyl group.

Examples of the alkoxy group in the respective general formulae include linear alkoxy groups such as a methoxy group, an ethoxy group, an n-propoxy group, an n-butoxy group, and an n-pentoxy group, and branched alkoxy groups such as an isopropoxy group, an isobutoxy group, a sec-butoxy group, a tert-butoxy group, an isopentoxy group, a 1-methylbutoxy group, a 2-methylbutoxy group, a 1-ethylpropoxy group, a 1,2-dimethylpropoxy group, a neopentoxy group, and a tert-pentoxy group.

Examples of the alkanoyloxy group in the respective general formulae include linear alkanoyloxy groups such as a methanoyloxy group, an ethanoyloxy group, an n-propanoyloxy group, an n-butanoyloxy group, and an n-pentanoyloxy group, and branched alkanoyloxy groups such as an isopropanoyloxy group, an isobutanoyloxy group, a sec-butanoyloxy group, a tert-butanoyloxy group, an isopentanoyloxy group, a 1-methylbutanoyloxy group, a 2-methylbutanoyloxy group, a 1-ethylpropanoyloxy group, a 1,2-dimethylpropanoyloxy group, a neopentanoyloxy group, and a tert-pentanoyloxy group.

Examples of the alkanediyl group in the respective general formulae include linear alkanediyl groups such as a methylene group, an ethylene group, a trimethylene group, a tetramethylene group, and a pentamethylene group, and branched alkanediyl groups such as a propylene group, a propane-2,2-diyl group, a butane-1,2-diyl group, a butane-1,3-diyl group, and a 2-methylpropane-1,3-diyl group.

In the above respective general formulae, R1 and R2 are each preferably an alkyl group having 1 or more and 5 or less carbon atoms, more preferably an alkyl group having 3 or more and 5 or less carbon atoms. When R1 and R2 are each an alkyl group having 1 or more and 5 or less carbon atoms, the polyol ester favorably achieves both compatibility with difluoromethane and a high viscosity. Further, the heat capacity of the polyol ester is not too large, and therefore, the heat dissipation of the refrigerator oil can be made favorable. Incidentally, R1 and R2 may be the same as or different from each other.

In the above respective general formulae, R1 and R2 are preferably a mixture of a linear alkyl group and a branched alkyl group, and more preferably a branched alkyl group. The branched alkyl group is likely to form an interaction with difluoromethane or another polyol ester even if it has a small carbon number. Due to this, for the polyol ester, it is suitable for achieving both of an appropriate high viscosity and favorable compatibility while suppressing the length of the side chain. Further, in addition to a hydrogen atom which binds to a secondary carbon atom, also a hydrogen atom which binds to a tertiary carbon atom can be coordinated with difluoromethane. A linear alkyl group and a branched alkyl group may be mixed at an appropriate ratio, and for example, a branched alkyl group can be substituted at a molar ratio of 50% or more.

An alkoxy group, an alkanoyl group, and an alkanoyloxy group in the respective general formulae each independently have preferably 1 or more and 5 or less carbon atoms, more preferably 3 or more and 5 or less carbon atoms. Incidentally, the number of carbon atoms may be the same for each type of substituent or may be different from one another. Further, the number of carbon atoms may be the same among the binding positions of the substituents or may be different from one another. When the number of carbon atoms is 1 or more and 5 or less, the same effect as in the case of an alkyl group can be obtained.

An alkoxy group, an alkanoyl group, and an alkanoyloxy group in the respective general formulae are preferably a mixture of a linear group and a branched group, and more preferably a branched group. Incidentally, these groups may be either of a linear group and a branched group for each type of substituent, or may be a mixture of a linear group and a branched group for the same type of substituent. When the substituent is a branched group, the same effect as in the case of an alkyl group can be obtained.

Specific examples of the cyclic polyol ester include, for example, Compound (2-1) to Compound (2-9) shown below. However, the cyclic polyol ester is not limited to these compounds.

[Chem. 7]

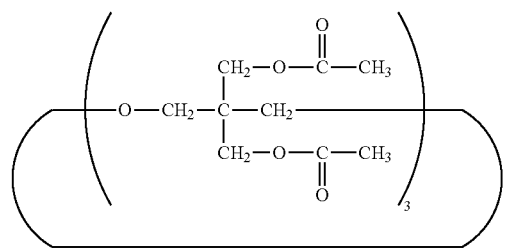
(2-1)

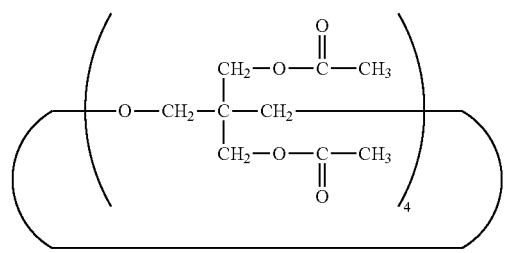
(2-2)

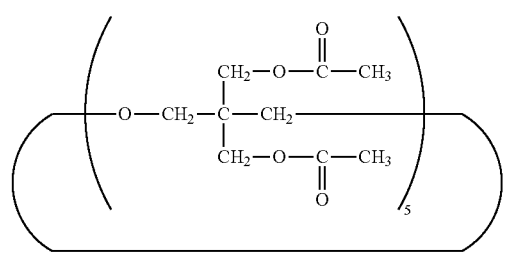
(2-3)

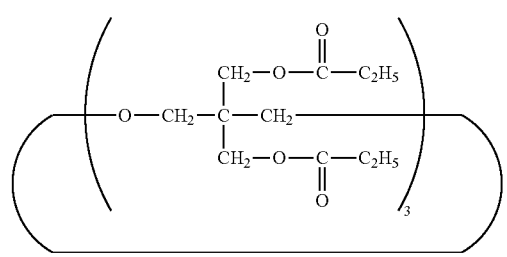
(2-4)

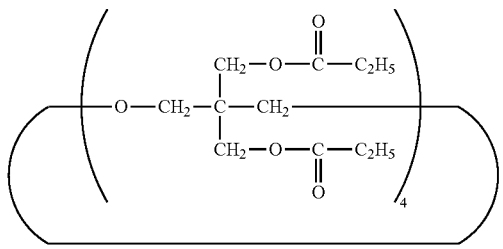
(2-5)

[Chem. 8]

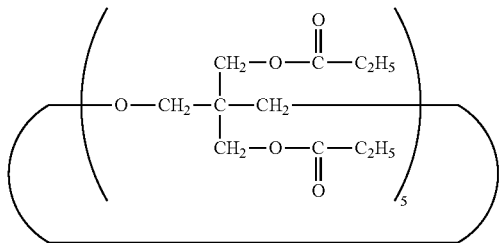
(2-6)

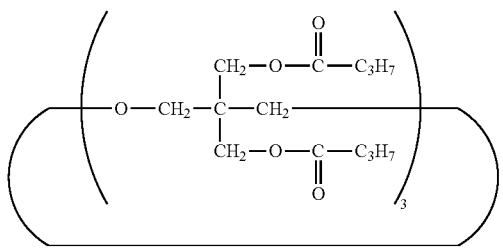
(2-7)

(2-8)

(2-9)

Specific examples of the crosslinked polyol ester include, for example, Compound (6-1) to Compound (6-6) shown below. However, the crosslinked polyol ester is not limited to these compounds.

[Chem. 9]
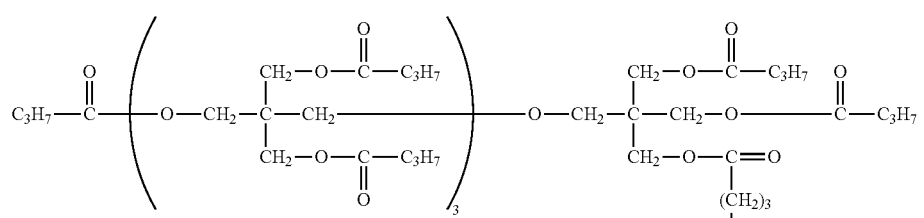
(6-1)
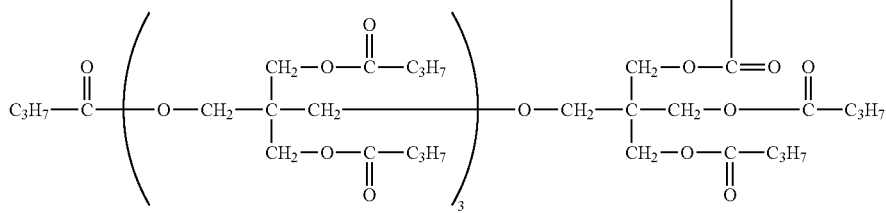
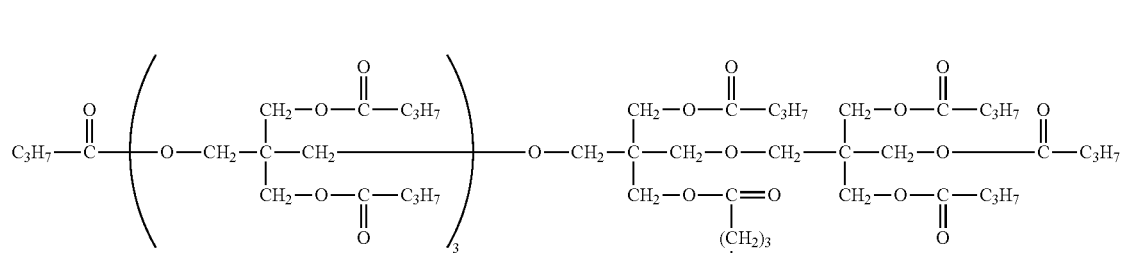
(6-2)
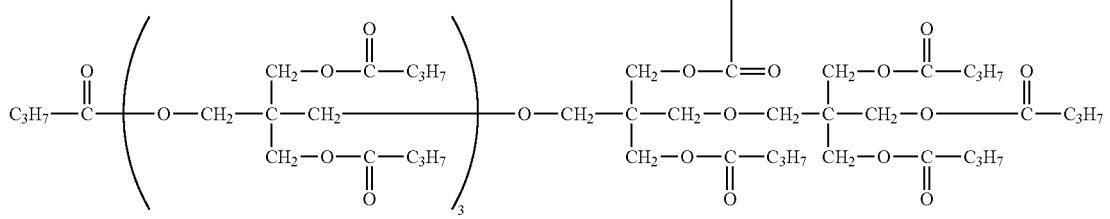
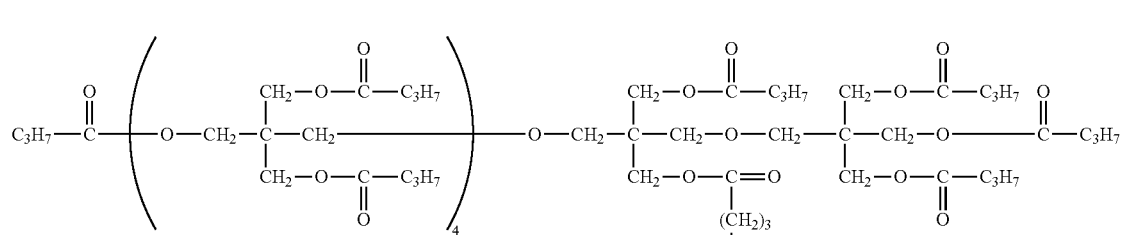
(6-3)
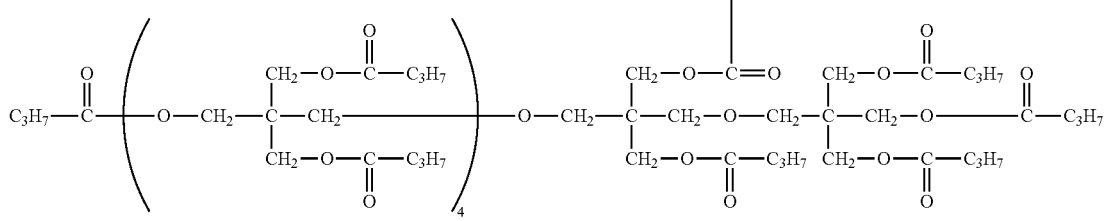

-continued

[Chem. 10]

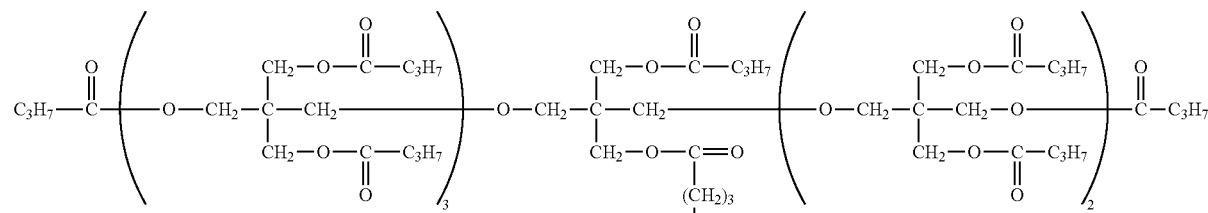

(6-4)

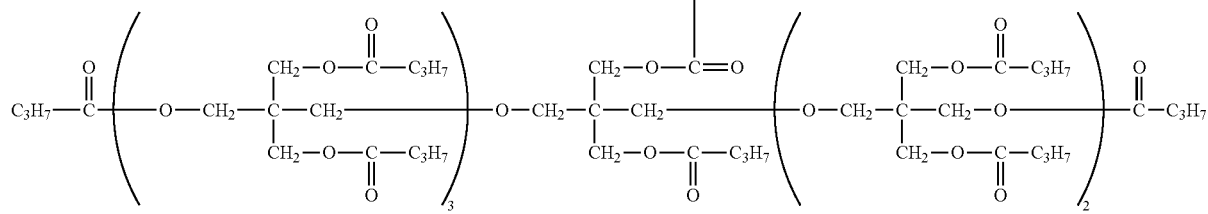

(6-5)

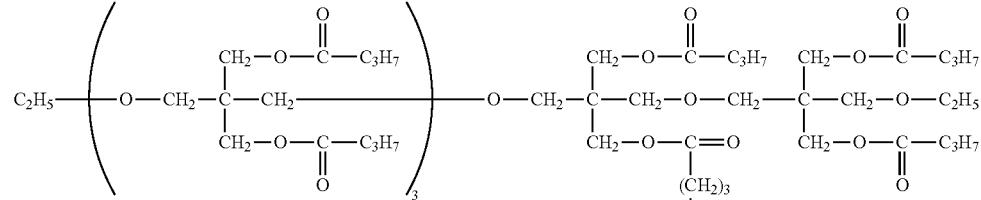

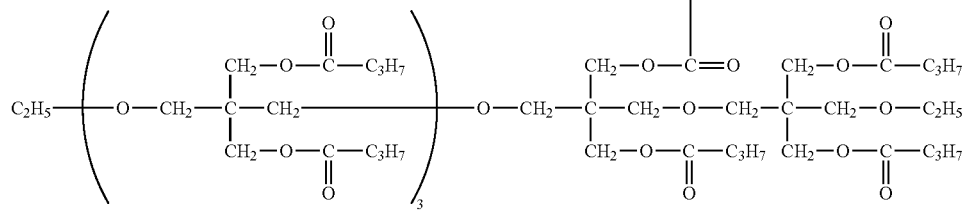

(6-6)

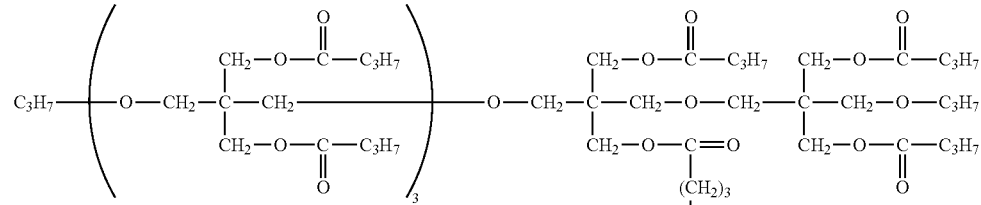

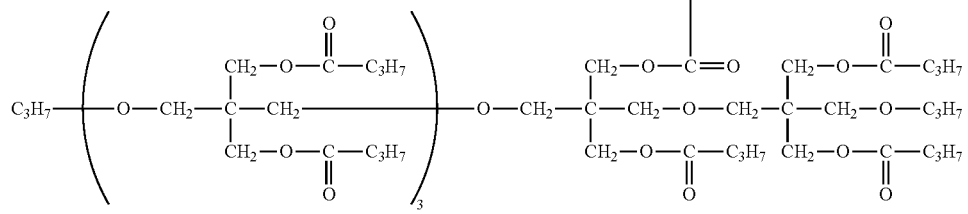

The cyclic polyol ester and the crosslinked polyol ester can be obtained using a known starting material and a known synthesis method. For example, by condensation polymerization of pentaerythritol, according to need, along with trimethylol propane, a monohydric alcohol, or the like, a cyclic polyol having a cyclized main chain or a linear polyol having a linear main chain can be obtained. Subsequently, by esterification of the cyclic polyol with a fatty acid or the like, a cyclic polyol ester is obtained. Further, by crosslinking of the linear polyol with a dicarboxylic acid, a dicarboxylic acid halide, a diester, an acid anhydride, or the like, and also esterification of a remaining non-crosslinked group without undergoing a crosslinking reaction with a fatty acid or the like, a crosslinked polyol ester is obtained.

The polyol ester which is the base oil of the refrigerator oil may contain a plurality of types of compounds having a different polymerization degree or a different substituent as the cyclic polyol ester, or may contain a plurality of types of compounds having a different polymerization degree or a different substituent or a different crosslinked structure as the crosslinked polyol ester. However, the polyol ester is more preferably composed of only one of the cyclic polyol ester and the crosslinked polyol ester, further more preferably composed of compounds in which any one of the polymerization degree, the substituent, and the crosslinked structure is the same, and particularly preferably composed of a single type of compound. When the molecular structures of the polyol esters are similar, in the case where the refrigerator oil receives an external force, the molecules of the polyol esters are likely to be mutually oriented in the same axial direction. Due to this, the refrigerator oil increases the resistance to the shear stress, and can exhibit a more favorable high viscosity. The kinematic viscosity of the refrigerator oil at 40° C. is preferably 30 mm²/s or more and 100 mm²/s or less.

The refrigerator oil may contain another component such as a stabilizer, a flame retardant, an extreme-pressure additive, an anti-wear agent, an anti-foaming agent, or an acid scavenger along with the polyol ester as the base oil. Examples of the stabilizer include diene-based compounds, phosphates, phenolic compounds, and epoxides. Examples of the flame retardant include tri(2-chloroethyl)phosphate, (chloropropyl)phosphate, tri(2,3-dibromopropyl)phosphate, tri(1,3-dichloropropyl)phosphate, diammonium phosphate, halogenated aromatic compounds, antimony oxide, aluminum trihydrate, polyvinyl chloride, fluorinated iodocarbon, fluorinated bromocarbon, trifluoroiodomethane, perfluoroalkylamines, and bromofluoroalkylamines.

Hereinabove, the compressor for refrigeration and air conditioning and the refrigeration and air conditioning device according to an embodiment of the present invention have been described, however, the above-mentioned refrigerator oil may contain another type of compound as a refrigerator oil along with the above-mentioned polyol ester. Examples of the another compound include mineral oils, silicone oils, polyalkylbenzenes, polyalkylene glycols, polyalkylene glycol esters, polyvinyl ethers, and polyalphaolefins. However, it is preferred to contain the above-mentioned polyol ester as the base oil, and the polyol ester is contained preferably at 50 mass % or more.

Further, the refrigeration and air conditioning device of the present invention is not limited to the air conditioning machine, and may be another refrigeration cycle device such as a refrigerator or a heat pump type water heater. Further, the compressor of the present invention is not limited to a scroll-type compressor, and may be a piston-type, a rotary-type, a screw-type, or a diaphragm-type compressor, or the like.

REFERENCE SIGNS LIST 1 outdoor unit
2 outdoor heat exchanger
3 indoor unit
4 indoor heat exchanger
5 compressor (compressor for refrigeration and air conditioning)
6 expansion valve
7 pipe
8 crossflow fan
9 propeller fan
10 four-way valve
11 swing scroll
11c swing bearing
12 fixed scroll
12c discharge port
12d suction port
13 electric motor
14 hermetically sealed container
14a suction pipe
14b discharge pipe
14c discharge pressure chamber
15 liquid reservoir
15a suction tube
17 frame
17a main bearing
18 crank shaft
18a oil supply passage
19 lower bearing
20 compression chamber
21 oldham ring
100 air conditioning machine (refrigeration and air conditioning device)

The invention claimed is:

1. A compressor for refrigeration and air conditioning, characterized in that a refrigerator oil containing a polyol ester having a structural unit represented by the following general formula (1):

[Chem. 1]

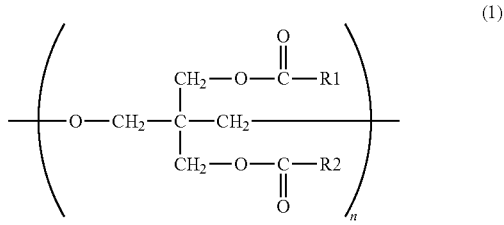

(wherein R1 and R2 each independently represent a linear or branched alkyl group; and n represents an integer of 2 or more), and a refrigerant containing difluoromethane are enclosed, and the polyol ester is composed of only one or both of a cyclic polyol ester, which is obtained by cyclically polymerizing a molecular chain having the structural unit, and a crosslinked polyol ester, which is obtained by crosslinking molecular chains having the structural unit with each other through a crosslinkable structural unit polymerized with the structural unit, and in which n in the structural unit is 3 or more.

2. The compressor for refrigeration and air conditioning according to claim 1, characterized in that
the cyclic polyol ester is represented by the following general formula (2):

[Chem. 2]

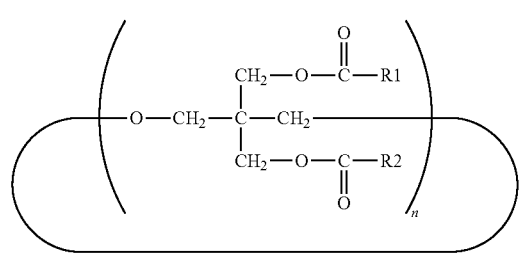

(2)

(wherein R1 and R2 each independently represent a linear or branched alkyl group; and n represents an integer of 2 or more), and
the crosslinked polyol ester has each of the structural units represented by the following general formulae (3), (4), and (5):

[Chem. 3]

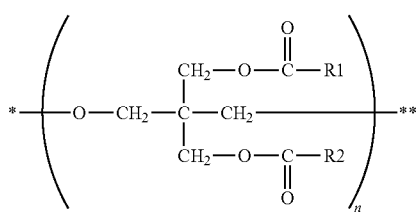

(3)

[Chem. 4]

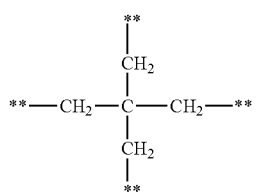

(4)

[Chem. 5]

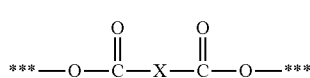

(5)

(wherein R1 and R2 each independently represent a linear or branched alkyl group; * represents a binding position to , a binding position of a hydrogen atom, a binding position of a linear or branched alkyl group, or a binding position of a linear or branched alkanoyl group;  represents a binding position to * or *, a binding position of a hydroxy group, a binding position of a linear or branched alkoxy group, or a binding position of a linear or branched alkanoyloxy group, X represents a linear or branched alkanediyl group, or a double bond; * represents a binding position to **; and n represents an integer of 3 or more).

3. The compressor for refrigeration and air conditioning according to claim 1, characterized in that the alkyl group is an alkyl group having 1 or more and 5 or less carbon atoms.

4. The compressor for refrigeration and air conditioning according to claim 1, characterized in that the alkyl group is an alkyl group having 3 or more and 5 or less carbon atoms.

5. The compressor for refrigeration and air conditioning according to claim 1, characterized in that the alkyl group is a branched alkyl group.

6. The compressor for refrigeration and air conditioning according to claim 1, characterized in that the crosslinked polyol ester has a linear or branched alkyl group at an end of the molecular chain.

7. The compressor for refrigeration and air conditioning according to claim 1, characterized in that the polyol ester is composed of only one of the cyclic polyol ester and the crosslinked polyol ester.

8. The compressor for refrigeration and air conditioning according to claim 1, characterized in that the refrigerant is composed of only difluoromethane.

9. A refrigeration and air conditioning device, characterized by comprising the compressor for refrigeration and air conditioning according to claim 1.

\* \* \* \* \*